United States Patent
Zachrisson et al.

(10) Patent No.: US 11,932,105 B2
(45) Date of Patent: Mar. 19, 2024

(54) VEHICLE WHEEL END ARRANGEMENT

(71) Applicant: VOLVO TRUCK CORPORATION, Gothenburg (SE)

(72) Inventors: Jan Zachrisson, Onsala (SE); Pär Öhrfeldt, Mölnlycke (SE); Ingemar Dagh, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 180 days.

(21) Appl. No.: 17/754,188

(22) PCT Filed: Sep. 26, 2019

(86) PCT No.: PCT/EP2019/076083
§ 371 (c)(1),
(2) Date: Mar. 25, 2022

(87) PCT Pub. No.: WO2021/058105
PCT Pub. Date: Apr. 1, 2021

(65) Prior Publication Data
US 2022/0297533 A1    Sep. 22, 2022

(51) Int. Cl.
*B60K 17/04*        (2006.01)
*B60K 7/00*         (2006.01)
*F16H 57/04*        (2010.01)

(52) U.S. Cl.
CPC .......... *B60K 17/046* (2013.01); *B60K 7/0007* (2013.01); *F16H 57/0441* (2013.01); *F16H 57/0471* (2013.01); *B60Y 2200/14* (2013.01)

(58) Field of Classification Search
CPC . B60K 17/046; B60K 7/0007; F16H 57/0441; F16H 57/0471; F16H 57/0435; F16H 57/045; B60Y 2200/14
See application file for complete search history.

(56) References Cited

U.S. PATENT DOCUMENTS

2010/0191417 A1* 7/2010 Murahashi .............. B60B 11/06
                                                           184/26
2012/0326573 A1* 12/2012 Yamamoto ............. H02K 7/116
                                                           310/67 R
(Continued)

FOREIGN PATENT DOCUMENTS

DE    102006014933 A1    10/2007
EP        0669219 A1     8/1995
(Continued)

OTHER PUBLICATIONS

International Search Report and Written Opinion dated May 8, 2020 in corresponding International PCT Application No. PCT/EP2019/076083, 9 pages.

*Primary Examiner* — Erez Gurari
(74) *Attorney, Agent, or Firm* — Venable LLP; Jeffri A. Kaminski

(57) ABSTRACT

The present disclosure relates to a vehicle wheel end arrangement (1), comprising: —a wheel spindle (2), —a wheel hub (3) rotatably mounted on the wheel spindle (2) about a rotational axis (A), —a drive shaft (4) for driving the wheel hub (3), —a reduction gear (5) arranged in an inner section (51) of the wheel hub (3), wherein the reduction gear (5) is connected to the drive shaft (4) for driving the wheel hub (3), —a reduction gear carrier member (6) connected to the wheel spindle (2), wherein the reduction gear carrier member (6) is carrying at least a portion of the reduction gear (5), wherein the vehicle wheel end arrangement (1) further comprises a lubricant pump (7) for circulating a lubricant in the wheel hub (3) and a lubricant conduit (61) which fluidly connects the lubricant pump (7) with the inner section (51) of the wheel hub (3), wherein the drive shaft (4) is drivingly connected to the lubricant pump (7) to drive the lubricant pump (7) and wherein at least a section of the (Continued)

lubricant conduit (61) is provided within the reduction gear carrier member (6).

16 Claims, 4 Drawing Sheets

(56) References Cited

U.S. PATENT DOCUMENTS

| | | | | |
|---|---|---|---|---|
| 2013/0009450 A1* | 1/2013 | Suzuki | ............ | H02K 7/116 |
| | | | | 301/6.5 |
| 2013/0057048 A1* | 3/2013 | Ishikawa | ............ | B60L 7/24 |
| | | | | 301/6.5 |
| 2013/0153338 A1* | 6/2013 | Yamauchi | ............ | H02K 9/19 |
| | | | | 184/26 |
| 2013/0292993 A1* | 11/2013 | Yukishima | ............ | B60K 7/0007 |
| | | | | 301/6.5 |
| 2013/0292994 A1* | 11/2013 | Yukishima | ............ | B60K 7/0007 |
| | | | | 301/6.5 |
| 2014/0041619 A1* | 2/2014 | Yamauchi | ............ | F16H 57/0486 |
| | | | | 123/196 R |
| 2019/0273412 A1* | 9/2019 | Taikou | ............ | B60B 37/10 |
| 2021/0046816 A1* | 2/2021 | Pritchard | ............ | B60K 6/387 |
| 2021/0317907 A1* | 10/2021 | Paoff | ............ | F16H 3/091 |
| 2022/0320962 A1* | 10/2022 | Yang | ............ | B60K 11/02 |
| 2023/0064580 A1* | 3/2023 | Filkins | ............ | F16N 13/20 |
| 2023/0114407 A1* | 4/2023 | Liu | ............ | B60K 11/02 |
| 2023/0128748 A1* | 4/2023 | Umerley | ............ | B60K 17/20 |
| | | | | 180/65.1 |
| 2023/0146341 A1* | 5/2023 | Nakawatari | ............ | F16H 57/0483 |
| | | | | 180/339 |

FOREIGN PATENT DOCUMENTS

| | | |
|---|---|---|
| EP | 1553332 A1 | 7/2005 |
| EP | 2572917 A1 | 3/2013 |
| WO | 2015046087 A1 | 4/2015 |

\* cited by examiner

VEHICLE WHEEL END ARRANGEMENT

CROSS-REFERENCE TO RELATED APPLICATIONS

This application is a U.S. National Stage application of PCT/EP2019/076083, filed Sep. 26, 2019 and published on Apr. 1, 2021, as WO 2021/058105 A1, all of which is hereby incorporated by reference in its entirety.

TECHNICAL FIELD

The invention relates to a vehicle wheel end arrangement and to a vehicle comprising the vehicle wheel end arrangement.

The invention can be applied in heavy-duty vehicles, such as trucks, buses and construction equipment. Although the invention will be described with respect to heavy-duty trucks, the invention is not restricted to this particular vehicle, but may also be used in other vehicles such as light-weight trucks, articulated haulers, excavators, wheel loaders, and backhoe loaders.

BACKGROUND

Vehicle wheel end arrangements may be provided with a drive shaft for driving a wheel hub of the wheel end arrangement. Further, in some occasions, the wheel end arrangement may also be provided with an integrated reduction gear, such as a planetary gear, for providing a gear reduction between the drive shaft and the wheel hub. This may particularly be useful when the wheel end arrangement is drivingly connected to an electric motor, even though also other motors/engines may be used.

The patent application with number EP 1 553 332 A1 discloses a wheel end connected to a drive axle, wherein the wheel end comprises a gear set which is driven by the drive axle. The gear set is enclosed within a gear housing, and the drive axle includes a pumping mechanism that maintains a predetermined oil level within the gear housing.

Even though the above disclosure presents a solution where a gear set of a wheel end is lubricated, there is still a strive towards developing improved lubricated vehicle wheel end arrangements.

SUMMARY

In view of the above, an object of the invention is to provide an improved vehicle wheel end arrangement which at least in some aspect alleviates at least one of the drawbacks of the prior art, and/or to at least provide a useful alternative.

According to a first aspect of the invention, the object is achieved by a vehicle wheel end arrangement according to claim 1. According to a second aspect of the invention, the object is achieved by a vehicle according to claim 16.

According to the first aspect thereof, the object is achieved by a vehicle wheel end arrangement which comprises a wheel spindle, a wheel hub rotatably mounted on the wheel spindle about a rotational axis and a drive shaft for driving the wheel hub. The vehicle wheel end arrangement further comprises a reduction gear arranged in an inner section of the wheel hub, wherein the reduction gear is connected to the drive shaft for driving the wheel hub, and a reduction gear carrier member connected to the wheel spindle, wherein the reduction gear carrier member is carrying at least a portion of the reduction gear. The vehicle wheel end arrangement further comprises a lubricant pump for circulating a lubricant in the wheel hub and a lubricant conduit which fluidly connects the lubricant pump with the inner section of the wheel hub, wherein the drive shaft is drivingly connected to the lubricant pump to drive the lubricant pump and wherein at least a section of the lubricant conduit is provided within the reduction gear carrier member.

By the term "provided within the reduction gear carrier member" is herein meant that the lubricant conduit is provided within the goods/material of the reduction gear carrier member. Hence, and optionally, the lubricant conduit may be integrated into the reduction gear carrier member.

By the provision of the present invention as disclosed herein, improved lubrication of the vehicle wheel end arrangement is achieved and also a more compact vehicle wheel end arrangement is provided. More particularly, by providing at least a section of the lubricant conduit within the reduction gear carrier member as set forth herein, no separate pipes or the like are required, thereby providing a more compact configuration having fewer components. Further, by reducing/minimizing the number of separate parts of the vehicle wheel end arrangement, a more reliable configuration can be provided, also reducing the risk of e.g. pipe leakage or malfunction which could otherwise occur. Furthermore, the present configuration as disclosed herein has also shown to provide improved circulation of the lubricant and thereby improved cooling of the reduction gear during operation. The lubricant used is preferably oil, even though also other types of lubricants may be used.

Optionally, the lubricant conduit may comprise a proximal end and a distal end, wherein the proximal end is proximal the lubricant pump and the distal end is provided at a vertically lower portion of the inner section of the wheel hub, as seen when the vehicle wheel end arrangement is mounted on a vehicle. Thereby, the lubricant conduit can advantageously be used for draining lubricant from the inner section of the wheel hub. A vertically lower portion as used herein means that the lower portion is at least provided below a horizontal plane intersecting a radial center of the wheel hub, such as proximal a bottom surface of the inner section.

Optionally, the lubricant pump may be arranged to drain lubricant from the inner section of the wheel hub via the lubricant conduit during operation.

Optionally, the lubricant pump may be attached to the wheel spindle. Attaching the lubricant pump to the wheel spindle has shown to be beneficial in that it may provide a simplified configuration and/or the configuration may be more compact. A more compact configuration is desirable since the available space for the wheel end arrangement in a vehicle is commonly restricted due to design restrictions. Still optionally, the lubricant pump may be provided in a lubricant pump seat receiving section of the wheel spindle, which lubricant pump seat receiving section circumferentially encloses the drive shaft. By having a lubricant pump seat receiving section which circumferentially encloses the drive shaft, a simplified attachment may be achieved, also enabling a more compact configuration.

Optionally, the lubricant pump may be arranged axially outside a wheel bearing arrangement and/or a brake disk of the vehicle wheel end arrangement. Thereby the lubricant pump may be located closer to the lubricant which is intended to be drained from the inner section where the reduction gear is provided via the lubricant conduit. Locating the lubricant pump closer to the inner section where the reduction gear is provided has shown to improve the suction capability of the pump, i.e. it may be beneficial to have a short distance between the lubricant pump and the inner section where the lubricant is present. Still optionally, the lubricant pump may be arranged axially inside the reduction gear, thereby providing a more compact vehicle wheel end arrangement. An axial direction means herein a direction following the rotational axis of the wheel hub. The reduction gear is optionally located at an axially outermost position of the vehicle wheel end arrangement.

Optionally, the lubricant conduit may be provided within a carrier arm of the reduction gear carrier member. The reduction gear carrier member may thus comprise one or more carrier arms, such as three, four, five or six carrier arms which may extend in a radial direction from the rotational axis of the wheel hub. As another example, the reduction gear carrier member may be disk and/or cup-shaped, wherein the lubricant conduit is provided within the disk and/or cup-shaped reduction gear carrier member.

Optionally, the vehicle wheel end arrangement may further comprise a one-way valve for allowing lubricant to only circulate in one direction. Still optionally, the one-way valve may be provided in the lubricant conduit in the reduction gear carrier member. A one-way valve may thus prevent lubricant leakage in the opposite direction, which otherwise could occur when the wheel hub is not rotating or rotating in an opposite direction, e.g. during reversing of the vehicle. Further, the one-way valve may also assure that lubricant is always kept in the lubricant pump, thereby avoiding or reducing the risk of pumping air. Still optionally, the vehicle wheel end arrangement may further comprise an auxiliary valve, e.g. a bypass valve, configured to reduce or prevent a pressure raise which may be provided towards the one-way valve when lubricant strives to circulate in the opposite direction.

Optionally, the lubricant conduit may further be provided within the wheel spindle. For example, when the lubricant pump is provided in the above mentioned seat receiving section, it may be beneficial to further provide the lubricant conduit within the wheel spindle. Thereby, no further pipes, or the like, are necessary for fluidly connecting the lubricant pump and the section of the lubricant conduit which is provided within the reduction gear carrier member.

Optionally, the lubricant pump may be a vane pump. A vane pump has shown to be a pump which can pump lubricant in an efficient manner and which also is compact and can e.g. be arranged around the wheel spindle, such as in the above mentioned seat receiving section. A vane pump and its function are well-known for the skilled person and will therefore not be further detailed herein.

Optionally, the reduction gear may be a planetary gear. A planetary gear is beneficial in that it may provide a desired speed reduction, and also it is compact, especially as seen in its axial direction.

Optionally, the lubricant pump and the lubricant conduit may be part of a closed lubrication system. For example, the closed lubrication system may also comprise a lubricant reservoir, such as a tank, from which lubricant is extracted, and whereby the lubricant is moved to the inner section and then taken out therefrom by the lubricant pump back to the lubricant reservoir, thereby creating a circulating lubrication system. Still optionally, the vehicle wheel end arrangement may further comprise a ventilation opening for ventilating the inner section of the wheel hub.

Optionally, the lubricant conduit may comprise a separate tube-formed element in which lubricant is adapted to flow. The tube-formed member may thus be provided at least partly within the reduction gear carrier member, such as within a bore of the reduction gear carrier member. The tube-formed member may be made of any kind of suitable material, such as steel, aluminium, brass, copper, polymer etc. The aforementioned one-way valve may further be provided in the tube-formed member.

According to the second aspect thereof, the object is achieved by a vehicle comprising the vehicle wheel end arrangement according to any one of the embodiments of the first aspect of the invention.

Advantages and effects provided by the second aspect of the invention are largely analogous to the advantages and effects provided by the vehicle wheel end arrangement according to the embodiments of the first aspect of the invention. It shall also be noted that all embodiments of the second aspect of the invention are applicable to and combinable with all embodiments of the first aspect of the invention and vice versa.

BRIEF DESCRIPTION OF THE DRAWINGS

With reference to the appended drawings, below follows a more detailed description of embodiments of the invention cited as examples.

In the drawings.

Figure 1:
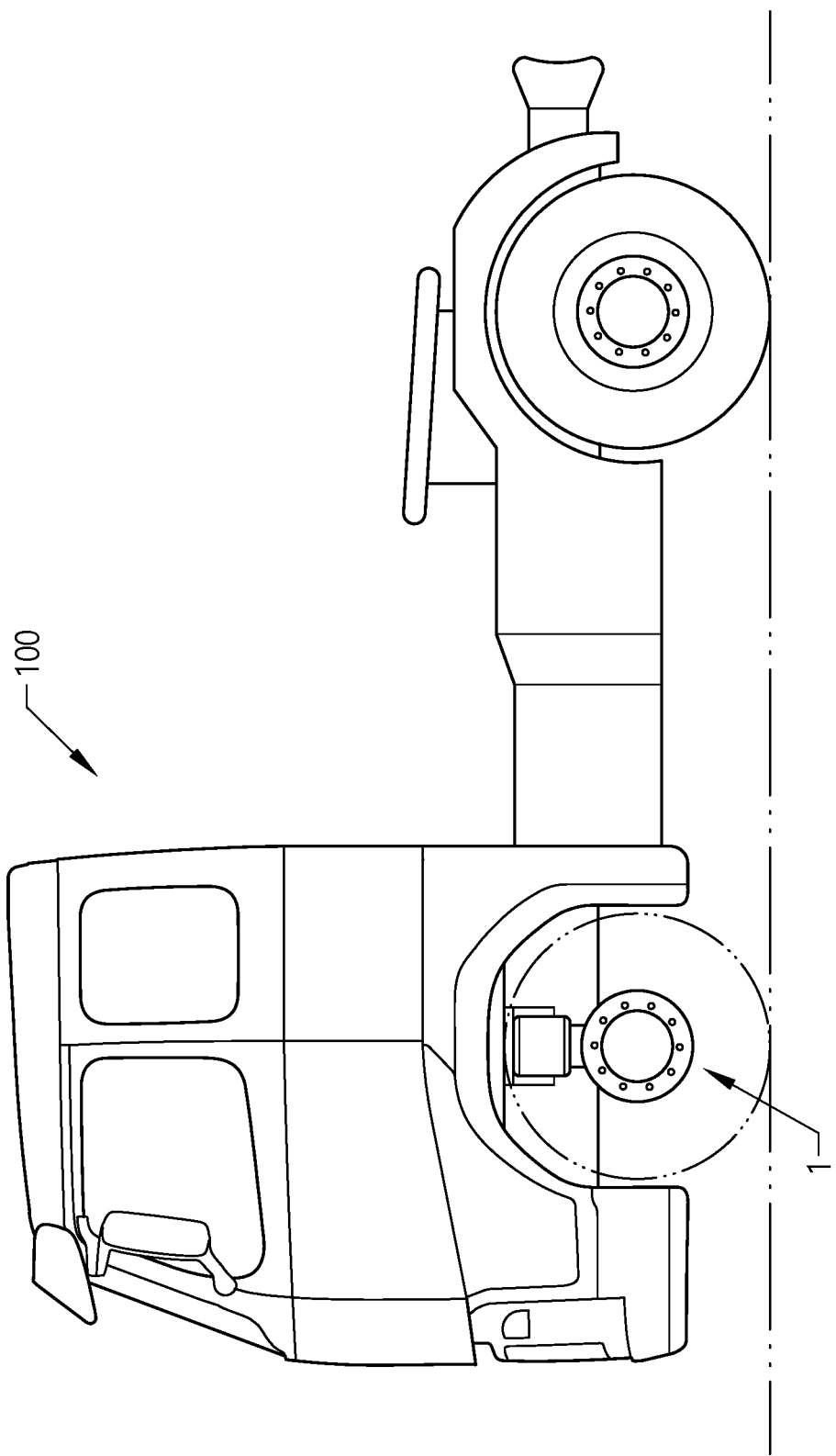
FIG. 1 shows a side view of a vehicle in the form of a truck according to an example embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

In FIG. 1, a vehicle in the form of a truck 100 is shown. The truck 100 comprises a vehicle wheel end arrangement 1 as e.g. shown in FIGS. 2-4. The vehicle wheel end arrangement 1 is here a front wheel end arrangement. It shall however be understood that the vehicle wheel end arrangement 1 may be provided also in other positions, such as in one or more rearward positions. A drive shaft 4 of the vehicle wheel end arrangement 1 may be drivingly connected to one or more electric motors (not shown) and/or to an internal combustion engine. Even though a truck 100 is shown it shall be understood that the present invention can also be used in other types of vehicles, such as buses, construction equipment vehicles etc.

Figure 2:
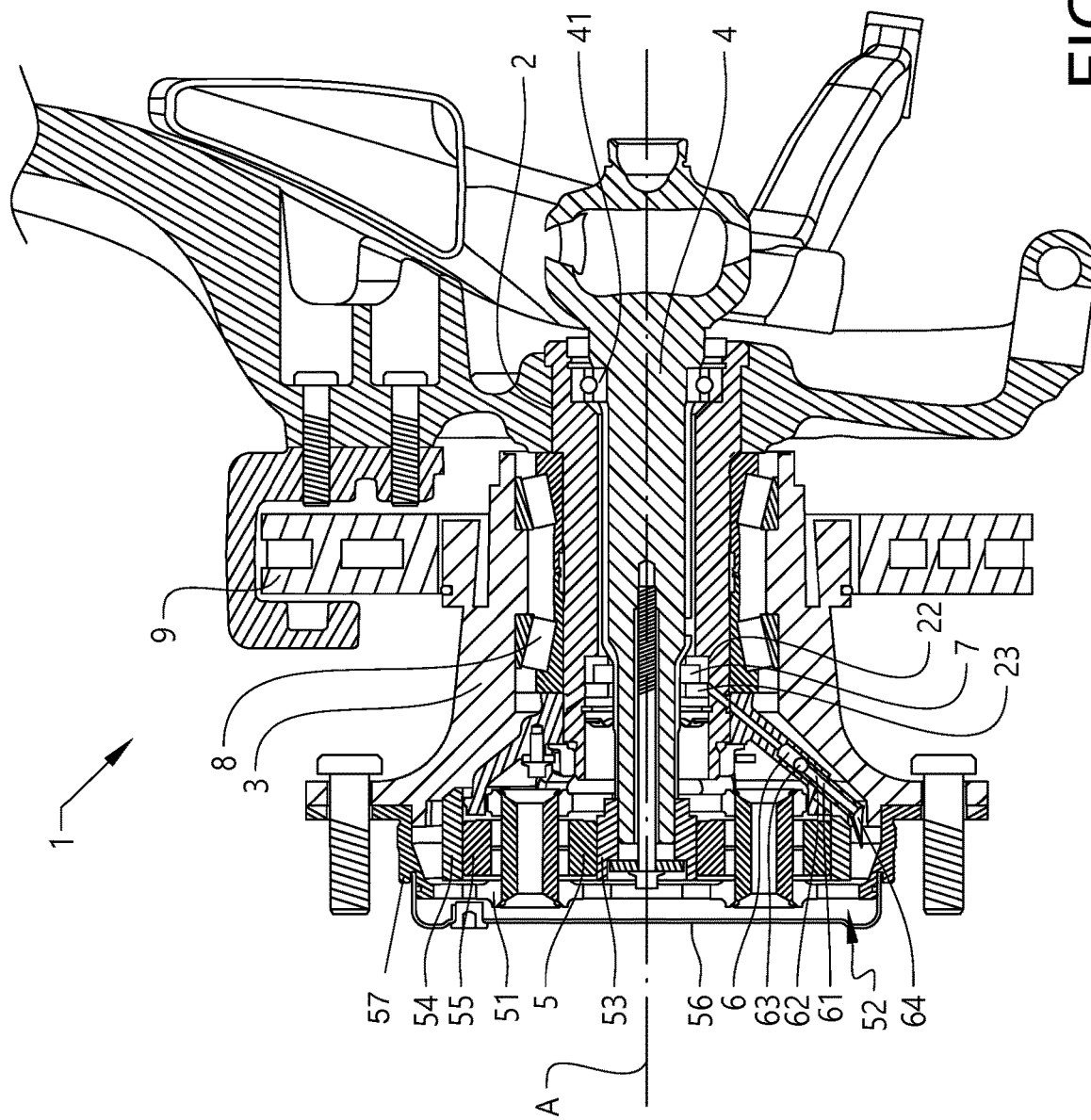
FIG. 2 shows a sectional view of a vehicle wheel end arrangement according to an example embodiment of the present invention.

With respect to e.g. FIG. 2, a sectional view of a vehicle wheel end arrangement 1 according to an example embodiment is shown. The section is a sectional plane which is defined by a rotational axis A of the vehicle wheel end arrangement 1. The vehicle wheel end arrangement 1 comprises a wheel spindle 2 and a wheel hub 3 which is rotatably mounted on the wheel spindle 2 about the rotational axis A.

Further, it comprises a drive shaft 4 for driving the wheel hub 3 and a reduction gear 5 arranged in an inner section 51 of the wheel hub 3, wherein the reduction gear 5 is connected to the drive shaft 4 for driving the wheel hub 3. In the shown embodiment, the drive shaft 4 is supported at one side by a rolling bearing 41 which is mounted in the wheel spindle 2 and at an axially outer side by the reduction gear 5. More particularly, the drive shaft is supported by and mounted to a sun gear wheel 53 of the reduction gear 5, which in the shown embodiment is a planetary gear.

The vehicle wheel end arrangement 1 further comprises a reduction gear carrier member 6 connected to the wheel spindle 2, wherein the reduction gear carrier member 6 is at least partly carrying the reduction gear 5, i.e. the planetary gear. More particularly, in the shown embodiment, the reduction gear carrier member 6 is carrying an outer ring gear 54 of the planetary gear 5. Planet gear wheels 55 are provided between the sun gear wheel 53 and the outer ring gear 54. A main planet gear carrier member 57 is connected to the wheel hub 3 and is carrying the planet gear 5. The main planet gear carrier member 57 is connected to the planet gear wheels 55. The vehicle wheel end arrangement 1 further comprises a lubricant pump 7 for circulating a lubricant in the wheel hub 3 and a lubricant conduit 61 which fluidly connects the lubricant pump 7 with the inner section 51 of the wheel hub 3. The drive shaft 4 is drivingly connected to the lubricant pump 7 to drive the lubricant pump 7 and at least a section of the lubricant conduit 61 is provided within the reduction gear carrier member 6. The inner section 51 in which the reduction gear 5 is located is closed from the outside by an outer cap 56.

Further, as e.g. shown in FIG. 2, the lubricant conduit 61 comprises a proximal end 23 and a distal end 64, wherein the proximal end 23 is proximal the lubricant pump 7 and the distal end 64 is provided at a vertically lower portion 52 of the inner section 51 of the wheel hub 3, as seen when the vehicle wheel end arrangement 1 is mounted on a vehicle 100. Lubricant provided in the inner section 51 will due to gravitational forces flow to the lower portion 52, i.e. to the bottom of the inner section 51. Thereby, the lubricant pump 7 can efficiently drain lubricant from the inner section 51 of the wheel hub 3 via the lubricant conduit 61 during operation, i.e. when the wheel hub 3 is rotating in one direction.

As can be further seen in FIG. 2, the lubricant pump 7 is attached to the wheel spindle 2. More particularly, the lubricant pump 7 is provided in a lubricant pump seat receiving section 22 of the wheel spindle 2, which lubricant pump seat receiving section 22 circumferentially encloses the drive shaft 4, i.e. it circumferentially encloses the rotational axis A.

The lubricant pump 7 is further arranged axially outside a wheel bearing arrangement 8 and a brake disk 9 of the vehicle wheel end arrangement 1, and further arranged axially inside the reduction gear 5. As shown, the reduction gear 5 may also be arranged in an axially outermost position of the vehicle wheel end arrangement 1. Hence, put differently, the lubricant pump 7 is provided axially in-between the wheel bearing arrangement 8/the brake disk 9 and the reduction gear 5. The wheel bearing arrangement 8 is in the shown embodiment in the form of a tapered roller bearing unit. It shall however be understood that also other types of bearings may be used, such as angular contact ball bearings, spherical roller bearings, sliding/plain bearings etc.

The shown reduction gear carrier member 6 is formed by a plurality of carrier arms, which extend in a radial direction out from the rotational axis A, whereby the lubricant conduit 61 is provided within one of said carrier arms 62. In fact, the lubricant conduit 61 is provided in a carrier arm 62 which extends radially towards the lower portion 52 of the inner section 51.

The vehicle wheel end arrangement 1 further comprises a one-way valve 63 for allowing lubricant to only circulate in one direction. The one-way valve 63 is here provided in the lubricant conduit 61 and within the carrier arm 62.

The lubricant conduit 61 is further provided within the wheel spindle 2 and extends to the lubricant pump 7 which is mounted in the seat receiving section 22. Thereby an efficient flow path from the lower portion 52 of the inner section 51 to the lubricant pump 7 is achieved without the need of providing additional separate members, such as pipes or the like outside the carrier member 6. The section of the lubricant conduit 61 which is provided within the wheel spindle 2 is preferably a bore, which may be a drilled bore. As mentioned in the above, the lubricant conduit 61 may comprise a tube-formed member (not shown) in which lubricant is adapted to flow and which extends in at least one of the sections of the lubricant conduit 61 provided in the carrier member 6 and in the wheel spindle 2.

The lubricant pump 7 as shown in e.g. FIG. 2 is a vane pump. A vane pump has shown to be beneficial in that it is compact and also provides a satisfying pumping effect. A vane pump is well-known for the skilled person and will therefore not be described more in detail herein.

Figure 3:
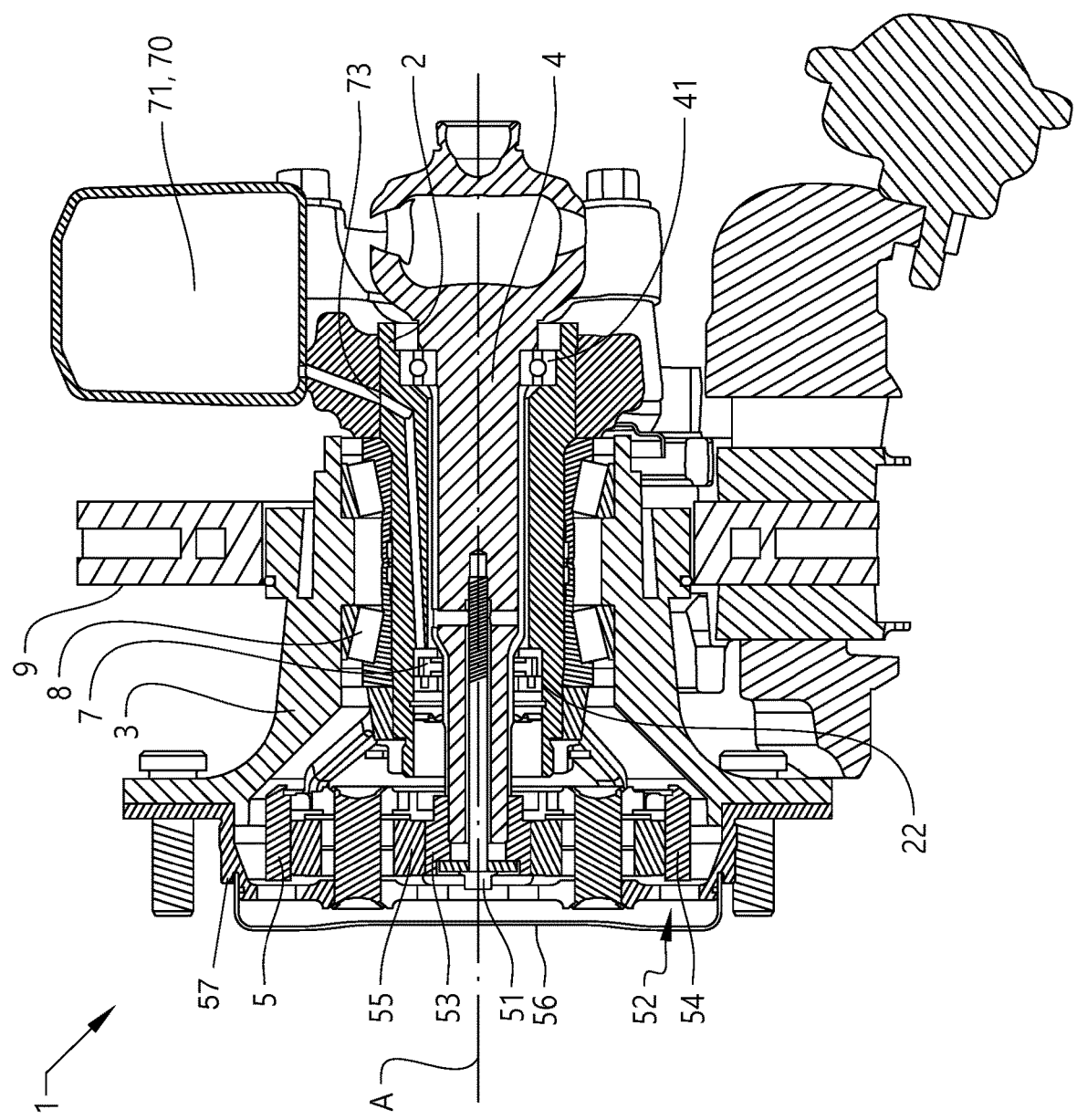
FIG. 3 shows another sectional view of the vehicle wheel end arrangement as shown in FIG. 2.
Figure 4:
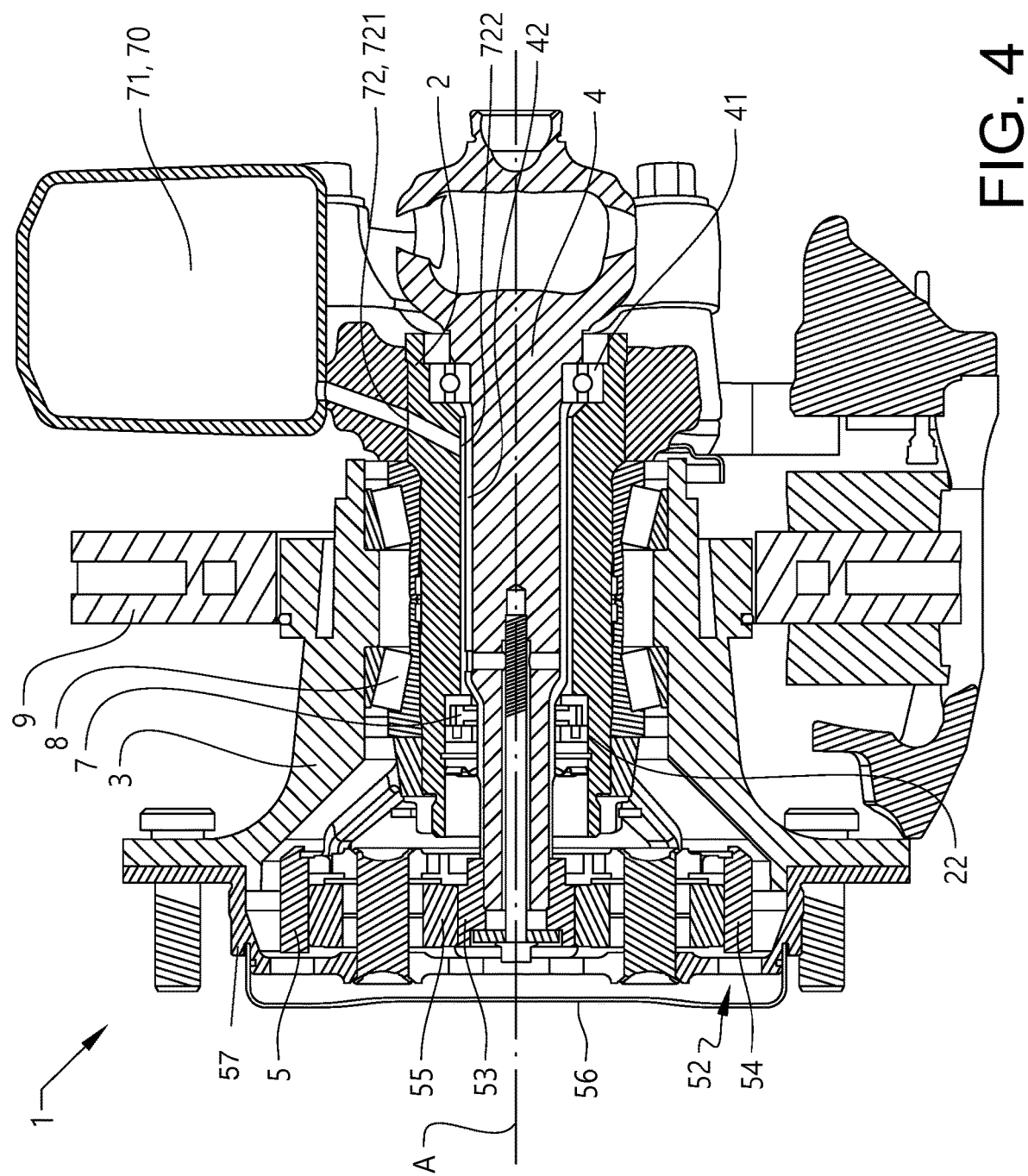
FIG. 4 shows yet another sectional view of the vehicle wheel end arrangement as shown in FIGS. 2 and 3.

The lubricant pump 7 and the lubricant conduit 61 are part of a closed lubrication system 70. The closed lubrication system 70 can be seen in e.g. FIGS. 3 and 4, and comprises a lubricant reservoir 71 where lubricant can be stored. The lubricant is preferably oil. The lubricant reservoir 71 is fluidly connected to the inner section 51 via a flow path 72. The flow path 72 is arranged for moving lubricant from the lubricant reservoir 71 to the inner section 51. As can be seen in e.g. FIG. 4, the flow path 72 may be provided in the wheel spindle 2. More particularly, the flow path 72 may comprise a bore 721 in the wheel spindle 2, followed by a space 722 which extends in an axial direction in-between the wheel spindle 2 and the drive shaft 4 towards the inner section 51. The space 722 may be defined by a sleeve 42 proximal the drive shaft 4 and an inner peripheral circumferential surface of the wheel spindle 2. The lubricant reservoir 71 may further be fluidly connected to the inner section 51 by a returning flow path 73, as shown in FIG. 3. The returning flow path 73 may also be provided in the wheel spindle 2, and is in the shown embodiment provided as a bore in the wheel spindle 2. The returning flow path 73 is fluidly connected to the lubricant pump 7, and arranged to return lubricant to the lubricant reservoir 71 when the lubricant pump 7 is active. The lubricant pump 7 is in turn fluidly connected to the inner section 51 via the lubricant conduit 61, as mentioned in the above. By e.g. the aforementioned configuration, a circulating closed lubrication system 70 is provided.

The inner section 51 of the wheel hub 3 may further comprise a ventilation opening (not shown) for ventilating the inner section 51 of the wheel hub 3. The ventilation opening may for example be provided as a bore which is provided in the wheel spindle 2.

It is to be understood that the present invention is not limited to the embodiments described above and illustrated in the drawings; rather, the skilled person will recognize that many changes and modifications may be made within the scope of the appended claims.

The invention claimed is:

1. A vehicle wheel end arrangement, comprising:
a wheel spindle, a wheel hub rotatably mounted on the wheel spindle about a rotational axis, a drive shaft for driving the wheel hub, a reduction gear arranged in an inner section of the wheel hub, wherein the reduction gear is connected to the drive shaft for driving the wheel hub, a reduction gear carrier member connected to the wheel spindle, wherein the reduction gear carrier member is carrying at least a portion of the reduction gear, wherein the vehicle wheel end arrangement further comprises a lubricant pump for circulating a lubricant in the wheel hub and a lubricant conduit which fluidly connects the lubricant pump with the inner section of the wheel hub, wherein the drive shaft is drivingly connected to the lubricant pump to drive the lubricant pump and wherein at least a section of the lubricant conduit is provided within the reduction gear carrier member.

2. The vehicle wheel end arrangement according to claim 1, wherein the lubricant conduit comprises a proximal end and a distal end, wherein the proximal end is proximal the lubricant pump and the distal end is provided at a vertically lower portion of the inner section of the wheel hub, as seen when the vehicle wheel end arrangement is mounted on a vehicle.

3. The vehicle wheel end arrangement according to claim 1, wherein the lubricant pump is arranged to drain lubricant from the inner section of the wheel hub via the lubricant conduit during operation.

4. The vehicle wheel end arrangement according to claim 1, wherein the lubricant pump is attached to the wheel spindle.

5. The vehicle wheel end arrangement according to claim 4, wherein the lubricant pump is provided in a lubricant pump seat receiving section of the wheel spindle, which lubricant pump seat receiving section circumferentially encloses the drive shaft.

6. The vehicle wheel end arrangement according to claim 1, wherein the lubricant pump is arranged axially outside a wheel bearing arrangement and/or a brake disk of the vehicle wheel end arrangement.

7. The vehicle wheel end arrangement according to claim 1, wherein the lubricant pump is arranged axially inside the reduction gear.

8. The vehicle wheel end arrangement according to claim 1, wherein the lubricant conduit is provided within a carrier arm of the reduction gear carrier member.

9. The vehicle wheel end arrangement according to claim 1, further comprising a one-way valve for allowing lubricant to only circulate in one direction.

10. The vehicle wheel end arrangement according to claim 1, wherein the lubricant conduit is further provided within the wheel spindle.

11. The vehicle wheel end arrangement according to claim 1, wherein the lubricant pump is a vane pump.

12. The vehicle wheel end arrangement according to claim 1, wherein the reduction gear is a planetary gear.

13. The vehicle wheel end arrangement according to claim 1, wherein the lubricant pump and the lubricant conduit are part of a closed lubrication system.

14. The vehicle wheel end arrangement according to claim 1, further comprising a ventilation opening for ventilating the inner section of the wheel hub.

15. The vehicle wheel end arrangement according to claim 1, wherein the lubricant conduit comprises a separate tube-formed element in which lubricant is adapted to flow.

16. A vehicle comprising the vehicle wheel end arrangement according to claim 1.

* * * * *